United States Patent
Khasawneh et al.

(10) Patent No.: US 7,912,020 B2
(45) Date of Patent: Mar. 22, 2011

(54) METHODS AND DEVICES FOR DYNAMIC MOBILE CONFERENCING WITH AUTOMATIC PAIRING

(75) Inventors: Firas S. Khasawneh, Palatine, IL (US); Daniel S. Rokusek, Long Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 783 days.

(21) Appl. No.: 11/859,375

(22) Filed: Sep. 21, 2007

(65) Prior Publication Data

US 2009/0081999 A1   Mar. 26, 2009

(51) Int. Cl.
  *H04W 4/00* (2009.01)
  *H04L 12/66* (2006.01)
  *H04B 7/00* (2006.01)
  *H04M 3/42* (2006.01)
(52) U.S. Cl. ........ 370/338; 370/352; 455/41.2; 455/416
(58) Field of Classification Search .................. 370/338, 370/352; 455/416, 41.2; 709/206
  See application file for complete search history.

(56) References Cited

U.S. PATENT DOCUMENTS

| | | | |
|---|---|---|---|
| 6,813,714 B1 * | 11/2004 | Hardjono et al. ............... 726/14 |
| 6,839,417 B2 * | 1/2005 | Weisman et al. ........ 379/204.01 |
| 7,209,705 B2 * | 4/2007 | Moles et al. .................. 455/41.2 |
| 2003/0217179 A1 * | 11/2003 | Famolari et al. .............. 709/245 |
| 2004/0003046 A1 * | 1/2004 | Grabelsky et al. ............. 709/206 |
| 2005/0048919 A1 * | 3/2005 | Jeannerod ..................... 455/41.2 |
| 2005/0188062 A1 * | 8/2005 | Li et al. .......................... 709/220 |
| 2006/0064458 A1 * | 3/2006 | Gehrmann ..................... 709/203 |
| 2007/0123166 A1 * | 5/2007 | Sheynman et al. ........... 455/41.2 |
| 2007/0156908 A1 * | 7/2007 | Szomolanyi et al. ......... 709/227 |
| 2007/0223725 A1 * | 9/2007 | Neumann et al. ............... 381/80 |
| 2007/0255435 A1 * | 11/2007 | Cohen et al. ..................... 700/94 |
| 2007/0294556 A1 * | 12/2007 | Wutka ............................ 713/324 |
| 2008/0200159 A1 * | 8/2008 | Lai .................................. 455/416 |
| 2008/0205616 A1 * | 8/2008 | Teng et al. ................ 379/202.01 |
| 2008/0248748 A1 * | 10/2008 | Sangster et al. .............. 455/41.2 |
| 2009/0023389 A1 * | 1/2009 | Paryani ......................... 455/41.2 |
| 2009/0061769 A1 * | 3/2009 | Zimbric et al. ............... 455/41.2 |
| 2009/0143012 A1 * | 6/2009 | Jeon ............................... 455/41.2 |
| 2009/0216837 A1 * | 8/2009 | Rao et al. ...................... 709/204 |

* cited by examiner

*Primary Examiner* — Chi H Pham
*Assistant Examiner* — Farah Faroul
(74) *Attorney, Agent, or Firm* — Gary J. Cunningham

(57) ABSTRACT

Described are methods and systems to preset a Bluetooth enabled headset and a Bluetooth enabled conference hub, so that at the time of a conference call, they are pre-paired and ready for use. Pairing information of a particular Bluetooth headset may be stored with a server and downloaded to a particular conference at the time of the scheduled conference. When a conference call is scheduled, via for example an email client conference scheduling tool, the hub will be automatically preset so that when a particular user with a headset comes within range, the headset and hub are paired and may transmit and receive communications between them. The described methods and systems can be used in large scale and small scale businesses with dynamic conferencing needs. The methods and systems can integrate with widely available email client conference scheduling tools currently used by many business enterprises.

19 Claims, 6 Drawing Sheets

| USER NAME | USER IDENTIFICATION | BLUETOOTH ADDRESS | LINK KEY | USER-FRIENDLY NAME |
|---|---|---|---|---|
| AUSTEN JANE | JANE@SROHTUA.COM | BT_ADDR_1 | LINK_KEY_1 | JANE'S HEADSET |
| DICKENS CHARLES | CHARLES@SROHTUA.COM | BT_ADDR_2 | LINK_KEY_2 | CHAZ |
| IRVING WASHINGTON | IRVING@SROHTUA.COM | BT_ADDR_3 | LINK_KEY_3 | IRVING |
| JOHNSON SAMUEL | SAM@SROHTUA.COM | BT_ADDR_4 | LINK_KEY_4 | SAM'S BT |
| JOYCE JAMES | JAMES@SROHTUA.COM | BT_ADDR_5 | LINK_KEY_5 | JAMES |
| NEWTON ISAAC | ISAAC@SROHTUA.COM | BT_ADDR_6 | LINK_KEY_6 | ISAAC'S HEADSET |
| POUND EZRA | EZRA@SROHTUA.COM | BT_ADDR_7 | LINK_KEY_7 | EZRA'S BT HEADSET |

*FIG. 4*

METHODS AND DEVICES FOR DYNAMIC MOBILE CONFERENCING WITH AUTOMATIC PAIRING

FIELD

Disclosed are methods and electronic devices for mobile conferencing, and more particularly methods and electronic devices for dynamic mobile conferencing with automatic pairing of conferencing devices.

BACKGROUND

Teleconferencing is widely used in business enterprises in today's wired world. Although traditional conferencing devices, such as for example, speakerphones, possess many advantages for teleconferencing, unintended eavesdropping as well as poor voice quality can be problematic, particularly if the speaking attendee is a distance from the conferencing device.

A Bluetooth mobile conferencing device (BTMC) which establishes and maintains short range communication with a plurality of Bluetooth-enabled headsets, may solve the problem of unintended eavesdropping and poor voice quality. In a BTMC, the voice communication is wirelessly streamed to one or more Bluetooth headsets rather than broadcast via a speakerphone. A BTMC may in addition provide mobility, in that teleconference participants may change their locations provided they remain within range of the BTMC. However, since a manual Bluetooth pairing process is typically required for use of a headset with a BTMC, any headset not previously paired must be paired by a pairing process that most users find cumbersome before the user of the not previously paired headset may participate in teleconferencing via that BTMC.

Large scale businesses may have many conference rooms, each having their own BTMC. A conference room with its BTMC may have several conferences scheduled during a day. Moreover, a user may be scheduled to attend several conferences during the course of a day, each in a different conference room with a different BTMC. In that case, a user may be required to go through the cumbersome task of pairing his or her headset with each BTMC for which the user has a conference scheduled.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 shows a table illustrating example Bluetooth and user information that may be stored in a database of the server;

Figure 1:
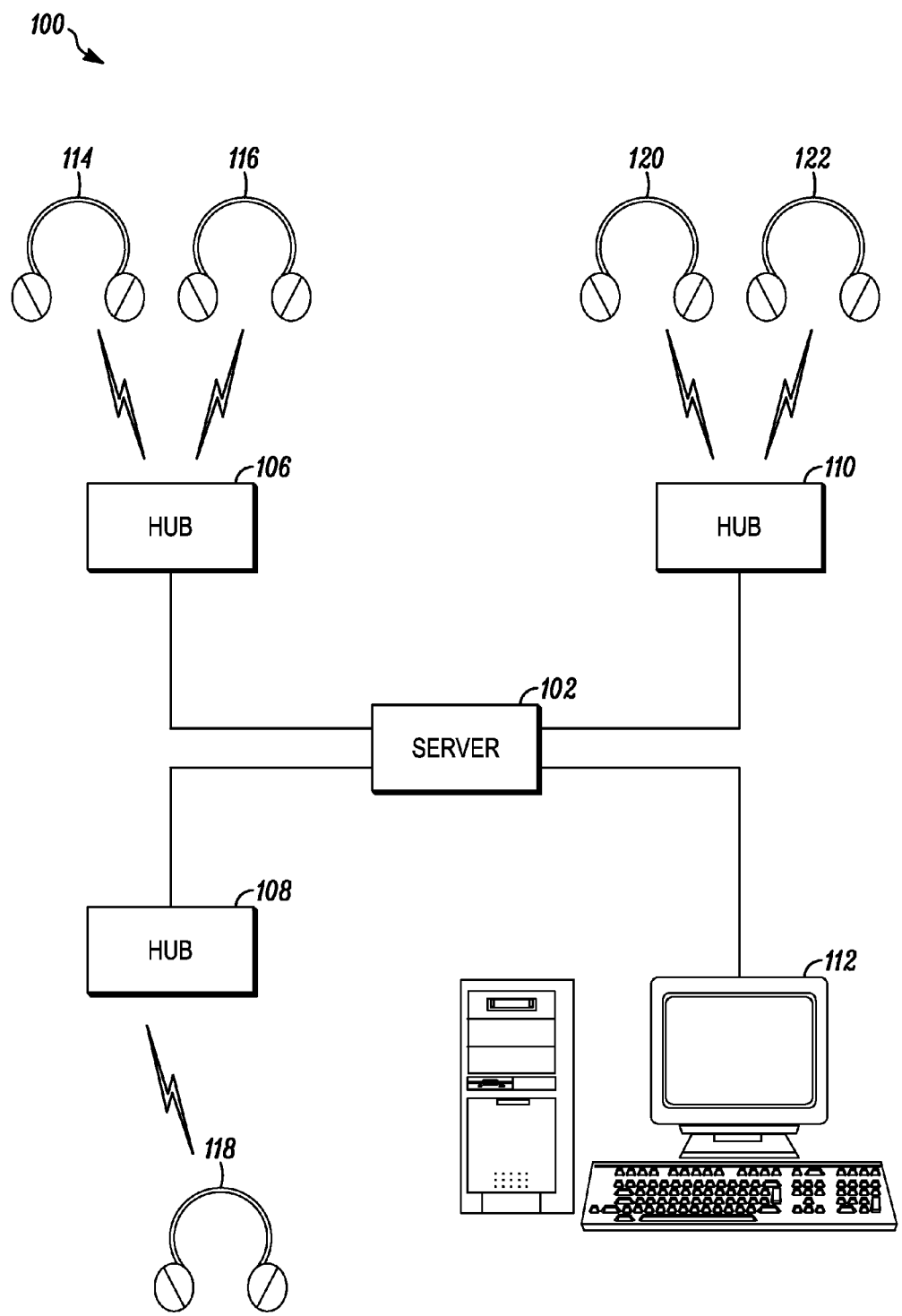
FIG. 1 illustrates an embodiment of a system for pre-pairing a Bluetooth enabled conference hub with a Bluetooth enabled headset in advance of a scheduled teleconference or communication.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

It would be beneficial if the manual pairing process to use a headset with a teleconferencing device or hub could be eliminated. It would further be beneficial if in advance of a teleconference a BTMC were pre-paired with the headsets of the users scheduled for a teleconference so that the headsets can be ready to use at the start of a conference without action by the user. It would also be beneficial if substantially only simple entry into a standard email client application to schedule a teleconference were required of a user to effect the pre-pairing between the headset and the BTMC for the scheduled conference.

Described below are methods and systems to preset headsets and a teleconference device or hub, such as for example a BTMC, so that at the time of the conference call, they are pre-paired and ready for use. When a conference call is scheduled, via for example an email client conference scheduling tool, the hub will be automatically preset so that when a particular user with a headset comes within range, the headset and hub are automatically paired. Accordingly, the headset and hub may transmit and receive communications between them, without a user being required to take action to accomplish the pairing at the time of the scheduled conference. The described methods and systems can be used in large scale and small scale businesses with dynamic conferencing needs. The methods and systems can integrate with widely available email client conference scheduling tools currently used by many business enterprises to set up conferences over BTMCs. In this way the cumbersome manual pre-pairing process for a user to participate in a BTMC conference with his or her own headset may be eliminated.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 illustrates an embodiment of a system 100 for automatically pre-pairing a Bluetooth enabled conference hub (BTMC) with a Bluetooth enabled headset in advance of a scheduled teleconference or communication. Based on a scheduled communication, where the scheduling of the communication may be made via, for example, an email client application, Bluetooth pairing information for a particular headset is transmitted to the hub prior to the conference to enable the automatic pre-pairing process. In this way, the cumbersome manual pre-pairing process for a user to participate in a BTMC conference with his or her own headset may be eliminated.

A conference hub may also be referred to in this disclosure as a conferencing device. The teleconference or scheduled communication may also be referred to as a conference call. By the below described methods and systems to preset headsets and a conferencing device or hub, the headsets and conferencing device are pre-paired and ready for use at the time of the conference call. When a conference call is scheduled, via for example an email client conference scheduling tool, the conference hub will be automatically preset so that when a particular user with a headset comes within range, the headset and hub are paired and then may transmit and receive communications between them.

The described system 100 may include a server 102 from which one or more conference hubs, for example 106, 108, and 110 may receive Bluetooth pairing information relating to a scheduled conference. The conference hub 106, for example may be configured to communicate with Bluetooth headsets 114 and 116. Other Bluetooth headsets may communicate with additional conference hubs, for example 108 and 110.

As mentioned above, a large business, in particular, may have many conference hubs. Each conference hub may be located in different conference rooms or facilities. In addition, a conference room may contain more than one conference hub. In this discussion a conference room may be any room that contains at least one conference hub. A user may schedule a conference call at a hub via, for example, an email client application. If there are other participants, they may be notified of the conference at that hub. The conference scheduled via an email client application may be processed via a server 102 so that information relating to the scheduling user's headset and the other participants' headsets may be transmitted to the hub at an appropriate time. In this way the hub and one or more headsets may be pre-paired prior to the scheduled conference.

So that it will be automatically preset to be pre-paired with a user's headset for a scheduled conference, a conference hub can receive predetermined client pairing information. The predetermined client pairing information includes pairing information for the Bluetooth enabled headset of the user, and also includes an associated client identifier that identifies the user. A client identifier may be for example, an email address, a telephone number, or another identifier. In this discussion, a client may be referred to as a user. To receive the predetermined client pairing information, the conference hubs may be connected with the server 102 via a communication network, for example, an IP network such as a wide area network (WAN), a local area network (LAN), or a piconet or ad hoc network. It is understood that the connections between the server 102 and the one or more hubs 106, 108, and 110 may be wired or wireless.

The system 100 may also include a computer 112 configured to communicate with the server 102. An automated or manual administrator, for example, may utilize the computer 112 to send headset pairing information for all intended users to the server 102 for storage. Pairing information of a user's headset may for example be stored with the server 102. The computer 112, any other computer, a PDA, a cell phone, or other communication device may also be utilized by a user to send schedule and attendee information as well as room or conference hub information to the server 102. An administrator or other authorized user may update, via for example the computer 112, conference scheduling and user attendance information.

In an embodiment the computer 112 can include the functionality of a server 102. That is, the server 102 and the computer 112 may be embodied together in the same device. The server 102 may be, for example, a personal computer, a desktop computer, a laptop computer, or a workstation.

Many computers today include Bluetooth capability, and therefore in an embodiment a computer may provide the functionality of a conference hub. That is, a laptop computer, for example, may connect to a WAN or LAN to provide VoIP, and at the same time may connect via Bluetooth to pre-paired Bluetooth headsets in its vicinity in order to facilitate a scheduled communication. In this manner for example, a laptop or other portable computer, or a desktop computer, may serve as a conference hub.

A computer with Bluetooth functionality may also facilitate capturing of pairing information from a Bluetooth headset. The headset may for example be paired with a laptop computer. The laptop computer for example may then supply the headset's pairing information and associated client identifier to the server 102. It is understood that in a computer, for example a laptop computer, portable computer, or another computer such as a desktop computer or workstation, that lacks built-in Bluetooth functionality, a USB Bluetooth adapter or dongle may be used. It is understood that any Bluetooth enabled device that may download information may be used to capture the pairing information of the headset 114 for storage to the server 102.

A pairing process enables each headset to be configured to communicate with the Bluetooth enabled hub according to, for example, a hands free protocol (HFP) such as HFP1.5 or a headset protocol (HSP). Pairing information that may include for example a friendly name or short name and a Bluetooth address may be transmitted to the hub by the server, close to the time of the conference. The pairing information, and pairing process, is described in more detail in connection with FIG. 4.

A conference may take place with participants in more than one conference room or location. Thus there may be several conference hubs, for example hub 108, that may receive pairing information from the server 102 for pairing with headset 118. In addition, for example, hub 110 may receive information from the server 102 for pairing with headsets 120 and 122. It is understood that although shown with three hubs, the described system may include a single hub or may include any number of hubs. It is further understood that the described system may include any number of Bluetooth enabled headsets. The operation of an embodiment of the system 100 is described in detail in connection with FIG. 3, FIG. 5, and FIG. 6. Preparatory to discussing the operation of the system 100, the server 102 for downloading pairing information to the conference hubs 106, 108, and/or 110 is described in more detail in connection with FIG. 2.

Figure 2:
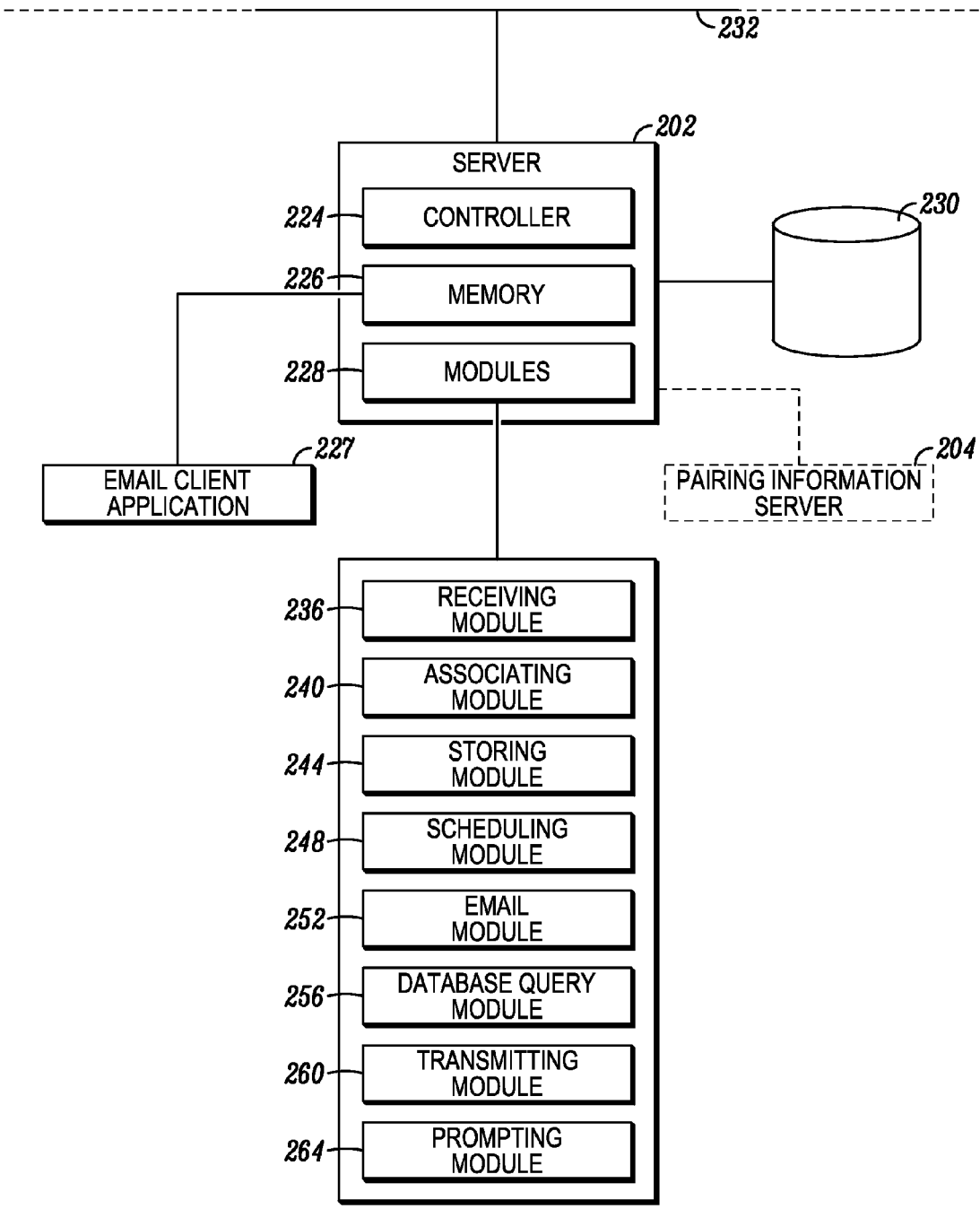
FIG. 2 shows an embodiment of a server of the system of FIG. 1 where the server includes a controller configured to execute instructions.

FIG. 2 shows an embodiment of a server 202 of the system 100 (see FIG. 1) where the server 202 includes a controller 224 configured to execute instructions, for example, for downloading pairing information to the conference hubs 106, 108, and/or 110. The instructions may be stored in a memory 226. The memory 226 may also include an email client application 227. Instruction modules 228 will be discussed in more detail in reference to the method flow chart diagrams. Modules may include a receiving module 236 configured to receive pairing information for a particular Bluetooth headset, an associating module 240 configured to associate the pairing information for the Bluetooth headset with a user or client identifier to form predetermined client pairing information, and a storing module 244 configured to store the predetermined client pairing information in a database 230 of the server.

The modules may also include a scheduling module 248 configured to interact with an email client application 227 to schedule a time and conference hub for a conference call or scheduled communication. An email module 252 may be configured to execute an email client application 227. The modules 228 may further include a database query module 256 configured to determine whether predetermined client pairing information is stored on the server, a transmitting module 260 configured to transmit notice of a scheduled communication to a client, and a prompting module 264 configured to prompt a user or client to transmit pairing information for a particular Bluetooth enabled headset.

The modules can carry out certain processes of the methods as described herein. The modules can be implemented in software, such as in the form of one or more sets of prestored instructions, and/or hardware, which can facilitate the operation of the server as discussed below. The modules may be installed at the factory or can be installed after distribution by, for example, a downloading operation. The operations in accordance with the modules will be discussed in more detail below.

The server 202 may send data to, and receive data transmitted from, a database 230, the data including client identifier information. For example, the server 202 may send data to the database 230 in accordance with instructions of storing module 244. The server 202 may further query the database in order to receive data, in accordance with instructions of database query module 256.

The database 230 may be configured to store pairing data associated with client identification information. As discussed above, the identification information for a particular user or client may include for example the email address of the user. The client identification information for a particular user may also, or in the alternative, include the telephone number of the user. It is understood that any unique identifier may be associated with pairing data for a particular user or client without departing from the scope of this disclosure.

A new user or new client may join for example, the organization or business enterprise, and may be provided a Bluetooth enabled headset which he or she may use for conferencing, or a user may user his or her own headset. In any case, client identification information and pairing information for the new user's Bluetooth headset may be provided to the server 202 for storage in the database 230. The client identification information and Bluetooth headset pairing information may be received by the server 202 in accordance with instructions of the receiving module 236. In this manner client identification information and pairing data can be available for conference scheduling by the server 202. The pairing data and identification information are discussed in detail below in connection with FIG. 4.

The server 202 may communicate with other components of the system 100 (see FIG. 1) via a communications network 232, which may be wired or wireless. For example, the server 202 may connect to conferencing devices such as 106, 108, and 110 (see FIG. 1) via an Ethernet connection, a USB connection, or via a WiFi connection to provide pre-pairing information and other conference information to appropriate conferencing devices. The network 232 may employ IP or another communication protocol. The server may receive conference scheduling data over the network 232 from a computer 112. Information or data to update a scheduled conference entry may be received by the server 202 from the computer 112, as well. It is understood any manner in which the server 202 may cooperate with other parts of the system 100 to facilitate operation of Bluetooth devices via for example, an IP network or other communication network 232 is within the scope of this invention.

For the collection of Bluetooth pairing information and client identifier information, client/server distributed collection of Bluetooth pairing and client information can be used to decentralize the pairing process. In an embodiment with distributed collection of pairing and client information there may be a lighter version of the Bluetooth and client information collection tool, a so-called thin client (not shown), that may run on a user's personal computer, for example. There may in addition be a separate pairing information server 204 that may communicate with, or be a part of, the server 202.

The thin client allows the user who needs to pair his headset to do so by using either an external or an internal Bluetooth device. An external Bluetooth device may be, for example, a USB Bluetooth adapter. The thin client then collects the pairing information along with the unique identification and sends it to the pairing information server 204.

The pairing information server 204 may verify the received pairing information from the thin client before storing it into the database. If the pairing information server 204 is not able to verify the data, it will indicate to the client any fault. It is understood that the distributed pairing can be either web based or IP based.

Figure 3:
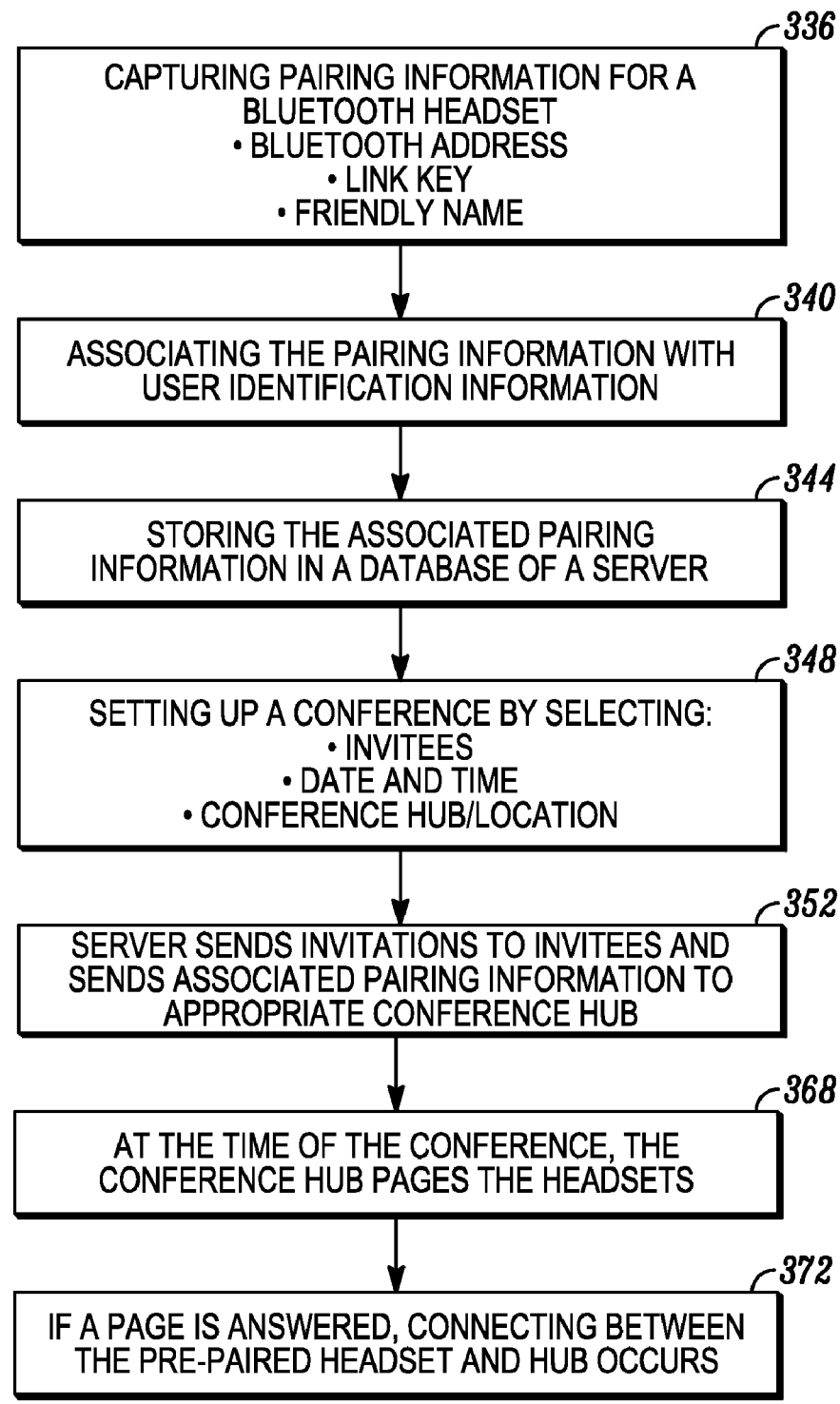
FIG. 3 is a flow chart that schematically depicts the operation of the system of FIG. 1 where the system can capture pairing information for all the intended users and can store the pairing information in a database.

FIG. 3 is a flow chart that schematically depicts the operation of the system 100 (see FIG. 1) where the system can capture pairing information for all the intended users and can store the pairing information in a database, for example database 230 (see FIG. 2). As mentioned above, the capturing 336 of pairing information may be accomplished by pairing a headset of a user with another Bluetooth device, for example the computer 112 (if Bluetooth enabled), the server 102, or with one of the conference hubs 106, 108, or 110.

During the capturing 336, the Bluetooth address of the headset device, for example headset 114 (see FIG. 1), is captured. During the pairing process used in the capture of pairing information, the Bluetooth headset 114 and the other Bluetooth device, for example, conference hub 106, generate and exchange a link key or authentication key. The link key is used to provide for encryption of Bluetooth transmissions between the two Bluetooth devices. A user friendly name may in addition be extracted from the headset 114, or may be provided by a user or administrator via, for example, the computer 112. The captured pairing information may be received by the server 102 in accordance with receiving module 236 (see FIG. 2), as mentioned above.

The captured pairing information for a user's headset is associated 340 with user or client identification information for that user. The client identification information may include, for example, an email address, a telephone number, office number, and/or any other identification that may be used to identify a user. The client information may be associated 340 with the Bluetooth pairing information in accordance with associating module 240 (see FIG. 2), as previously discussed. The associated pairing information may be stored 344 by the server 102 (see FIG. 1) in a database as discussed below. The storing 344 of the associated pairing information may be carried out by the server according to storing module 244.

A conference may be scheduled by an administrator or another authorized user by selecting 348 a set of invitees for the conference. The selecting of the set of invitees may be done for example via an email client application 227 (see FIG. 2) or a calendaring application that may be tied to an email application, or the selecting 348 may be done via another application. An application may for example provide a drop down list that can include user names, user offices, user telephone number or other user identifiers that may be used for selecting a set of invitees.

A date and time for the conference and a conference hub can be chosen. The conference hub may be chosen by choosing the conference room, since in many instances a conference room may contain a single conference hub. The drop down list described above, or another drop down list, may include conference rooms, hub identifiers, or a user's office or even a user's laptop computer, so that the administrator or authorized user can schedule the conference hub as part of the conference. In this way the server 102 (see FIG. 1) may be provided the identity of the conference hub to which to download the conference information. The server 102 in this case may send predetermined pairing information for the conference to only the conference hubs scheduled by the administrator as part of the conference. Moreover, a topic and planned duration for the conference may be entered via the email client application 227 (see FIG. 2) or another application.

An email client application 227 (see FIG. 2) or calendaring application, or another application configured to interact with the server 202 may allow the administrator to add and delete attendees subsequent to the initial scheduling of the conference. The updated conference information can be downloaded to the conference hub, for example, conference hub 106 (see FIG. 1) to take effect. The conference hub 106 may be configured to, for example, compare the conference information already on the server 102 with the updated conference information, and then invite a new user or discard a current user.

For example, scheduled conference attendees could be expected to send a reply to the conference notice. Replies from scheduled attendees to the conference notice may be forwarded to the server 102 (see FIG. 1). Prior to the start of the scheduled conference, the server 102 may use the scheduled attendees' email addresses or other identifiers, retrieve the appropriate pairing information, assemble the conference information, and then download the conference information to the selected conference hub or hubs, for example, conference hubs 106, 108, and 110. Predetermined pairing information for any attendees who rejected the conference notice will be excluded by the server 102. Predetermined pairing information for scheduled attendees who are tentative or do not respond will be included with the downloaded conference information.

When the conference has been scheduled by the administrator or other user, the server 102 (see FIG. 1) may interact 352 with an email client to send conference invitations to the invitees. The conference invitations may include information such as the location, topic, time and duration. Other useful information can be added as well. In this manner participants may receive timely notice of the scheduled conference. The server may utilize the user identification or client information for each invitee to retrieve from the database 230 (see FIG. 2) the pairing information for each user's Bluetooth headset. Prior to the conference, the server sends 352 the pairing information to the conference hub.

At the time of the conference, the conference hub, for example, conference hub 106 (see FIG. 1) can initiate 368 a paging process for each headset selected for the conference. During paging, the conference hub 106 attempts to connect with a Bluetooth headset, for example, headset 114, using the headset's Bluetooth address. If the headset 114 responds to the page, the conference hub 106 determines that the link key is already set up, that is, that the conference hub and the headset are pre-paired. The connecting process then completes 372 automatically between the hub 106 and the headset 114. In this way, the cumbersome manual pre-pairing process for a user to participate in a conference with his or her own headset may be eliminated. Additional details of the operation of the system 100 (see FIG. 1) are provided below in connection with FIGS. 5 and 6.

FIG. 4 shows a table 476 illustrating example pre-pairing and client identifier information that may be stored in the database 230 (see FIG. 2). As mentioned above, the database 230 may contain information for all possible users of the conferencing system 100 (see FIG. 1). The information for each user may be stored in the database 230 using a unique identified for the user as, for example, a lookup key in order to retrieve the information for use in scheduling a conference.

Each user in column "User Name" 478 has a Bluetooth headset that may be used for conferencing via a hub or conferencing device. The table 476 includes data for a user name 478, data for a user identification 480, a Bluetooth address for the user's Bluetooth headset 482, a link key or authentication key for the headset 484, and a user friendly name for the user's Bluetooth headset 486.

The user name 478 may for example be used by an administrator, other user, or email or other software to search the database 230 (see FIG. 2) for data associated with a particular user. For example, a user may wish to invite a particular user to a conference, and so may wish to select a user's name from a list or menu. As another example, an administrator may want to update information for a particular user, and may use the user name as a search key into the database 230.

The Bluetooth address 482 for the user's Bluetooth headset is used for paging and pairing processes, by which the conference hub, for example, conference hub 106 (see FIG. 1) attempts to establish a connection with the headset, for example, headset 114. Once a connection is established, the Bluetooth address 482 enables continued communication between the devices. A Bluetooth address 482 is a 48-bit number. Bluetooth addresses 482 in the table of FIG. 4 are shown as, for example, BT_ADDR_1, but may typically be indicated as 6-byte strings, for example, AA0563B4FE72. The user friendly name 486 for the user's Bluetooth headset is in some instances more convenient and transparent than use of the Bluetooth address for the user's headset 114.

During pairing, as discussed above, two Bluetooth devices engage in a process to exchange information and generate a link key or authentication key. The link key provides for encryption of data exchanged between the two devices, and is a 128-bit number. Bluetooth link keys 484 in the table of FIG. 4 are shown as, for example, LINK_KEY_1, but may typically be indicated as 16-byte strings. The data to be transmitted between the Bluetooth devices may include, for example, voice data or music data. Thus, providing a link key to the conference hub 106 (see FIG. 1) by the server 102 can pre-pair the hub with a headset 114 to enable secure Bluetooth communication between the headset and the conference hub. In this manner the problem of eavesdropping through use of another wireless device may be minimized.

The pairing information that is stored in the database 230 (see FIG. 2) is associated with a unique identification, as discussed above, to distinguish a user's information from the information of other users. Conference information is retrieved by the server 102 (see FIG. 1) from the database 230 and then downloaded to the conferencing device 106. The conference information contains the connection/pairing information for the selected attendees and may contain other general conference information as well. The conferencing device 106 allows only the headset devices associated with the selected attendees to connect to the conference. In this manner the possibility of eavesdropping may be minimized. Moreover, the cumbersome manual pre-pairing process for a user to participate in a Bluetooth enabled conference with his or her own headset may be eliminated.

Figure 5:
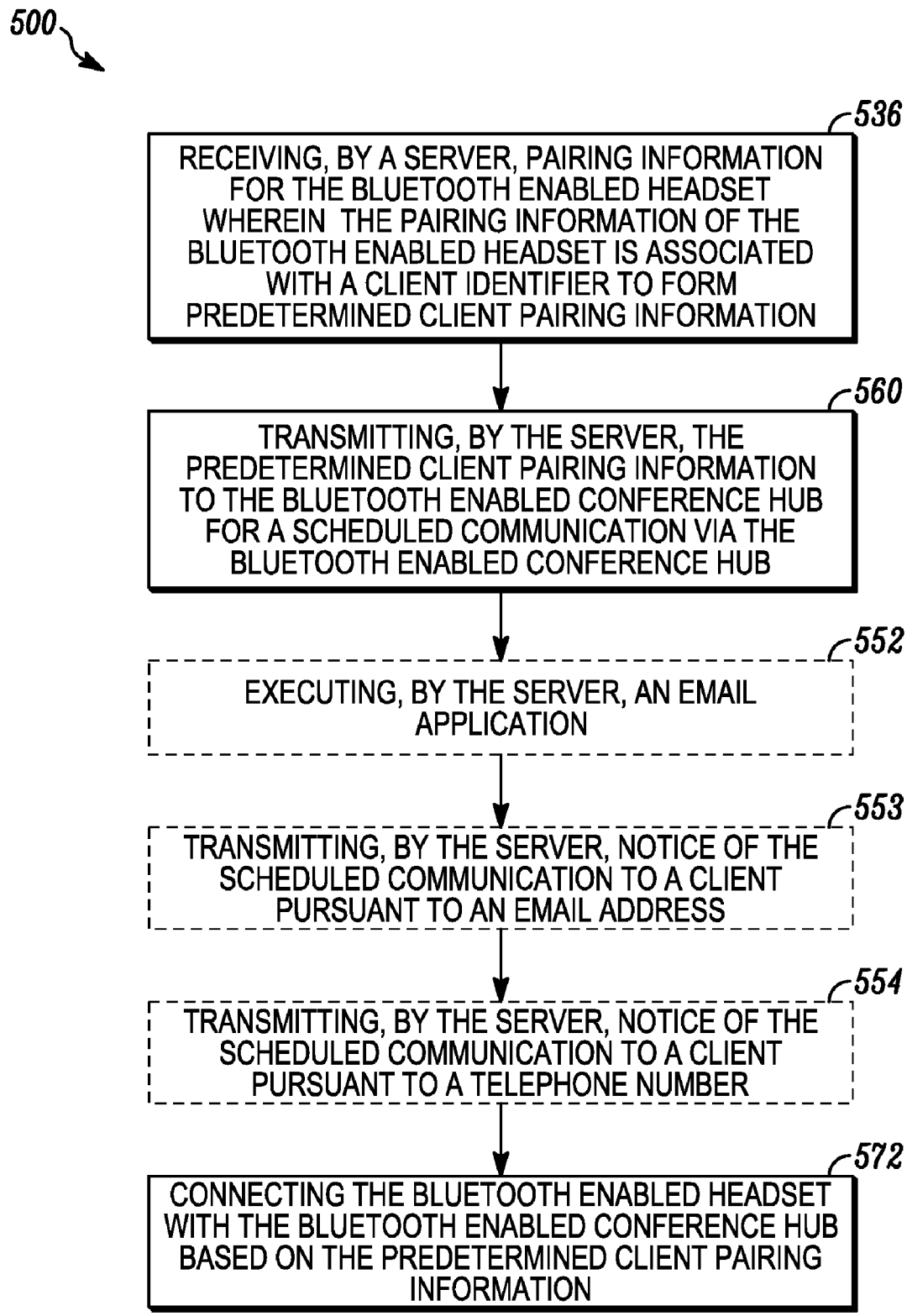
FIG. 5 is a flow chart of an embodiment of a method for pre-pairing a Bluetooth enabled conference hub with a Bluetooth enabled headset.

FIG. 5 is a flow chart of an embodiment of a method 500 for pre-pairing a Bluetooth enabled conference hub 106 (see FIG. 1) with a Bluetooth enabled headset 114 so that when a user comes into range of the conference hub at the time of the conference, the conference hub and the user's headset are automatically paired. The server 102 may receive 536 pairing information for a Bluetooth headset 114 in accordance with receiving module 236 (see FIG. 2) as discussed previously. The pairing information may be associated with a client or user identifier according to associating module 240 to form predetermined client pairing information. As discussed above in connection with FIG. 4, the associated information may be arranged for example in a table 476. The tabulated predetermined client pairing information may be stored in the database 230 of the server according to storing module 244.

Prior to a scheduled conference or scheduled communication among selected users of the system 100 (see FIG. 1) the server 102 may download or otherwise transmit 560 the predetermined client pairing information to the conference hub. For example, the server may transmit the predetermined client pairing information to the conference hub by executing 552 an email application 227 (see FIG. 2) according to email module 252. The server 102 may in addition transmit notice of a scheduled communication to a client, for example pursuant to an email address 553 of the client, or pursuant to a telephone number 554 of the client.

At the time of the conference, the conference hub 106 (see FIG. 1) commences paging each of the Bluetooth headsets, for example, headset 114 and 116, whose predetermined pairing information was provided to the hub 106 by the server 102 for that particular conference. In paging a Bluetooth headset 114, the conference hub 106 invites the Bluetooth headset to acknowledge the page and enter a pairing process to exchange a link key with the conference hub. Since in this instance, both the hub 106 and the headset 114 already share a link key, connecting 572 the Bluetooth enabled headset with the Bluetooth enabled conference hub based on the predetermined client information may take place. It is understood that the conference hub 106 typically shares a different link key with each Bluetooth enabled headset 114, 116. In this manner the Bluetooth enabled conference hub 106 may pair with the Bluetooth enabled headset 114 based on the predetermined client pairing information.

The headsets 114, 116 (see FIG. 1) may be configured to respond only to the pages from the conference hub 106. Thus, in an embodiment the conference hub 106 may implement a flexible paging scheme, in order to handle dropped, rejected or out of range connections. The conference hub 106 may be configured so that, if all configured headsets 114 and 116 are connected to the conference hub, then no paging is required, and paging will stop. The conference hub 106 may also be configured so that, if all configured headsets 114 and 116 have been paged, and some are connected, with others rejected then no paging is required, and paging will stop.

The conference hub 106 (see FIG. 1) may in addition be configured so that, if one or more connections get dropped, then the conference hub may page those dropped connections with delay between paging cycles of, for example, 30 seconds. The hub 106 may continue paging, for example, for three paging cycles. After paging for three cycles, the paging will stop.

Headsets that have rejected the connection may not be paged again. However, paging upon user request may take place, for example, via a button or other input device on the conference hub 106 (see FIG. 1). Upon user request, one paging cycle may be executed. In this cycle all the dropped or rejected connections will be paged.

Figure 6:
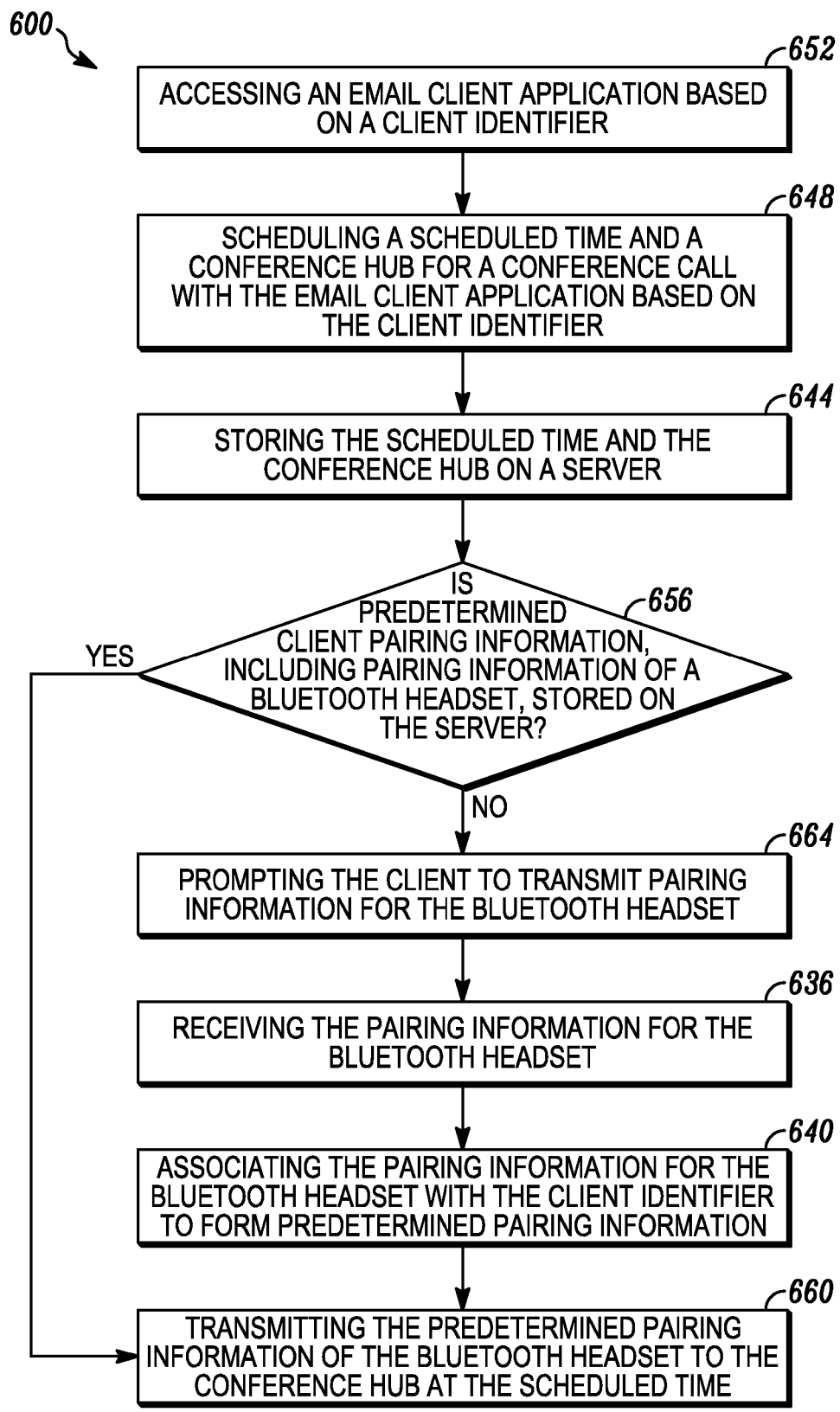
FIG. 6 is a flow chart of an embodiment of a method for pairing a Bluetooth headset and a Bluetooth conference hub.

FIG. 6 shows a flow chart of an embodiment of a method 600 for pairing a Bluetooth headset 114 (see FIG. 1) and a Bluetooth conference hub 106. An administrator or other authorized user may access 652 an email client application 227 (see FIG. 2) based on a client identifier. It is understood that in an embodiment, a server 102 may include capability for such access of an email client application 227, for example, according to email module 252.

The server 102 (see FIG. 1) may schedule 648 a scheduled time and a conference hub for a conference call with the email client application 227 (see FIG. 2) based on the client identifier. The scheduled conference call may be tracked in a database 230 or other application or data structure, for example, a calendaring tool that may cooperate with the email client application 227. In an embodiment, the scheduled conference call information, including the scheduled time and an identifier of the conference hub 106 may be stored 644 on the server 102 and/or in the database 230 associated with the server.

The server 102 (see FIG. 1) determines 656, for example through a database query, whether predetermined client pairing information, including pairing information of the Bluetooth enabled headset 114 associated with a client identifier, is stored on the server 102. If the predetermined client pairing information (see FIG. 4) is determined to be stored, the server may transmit 660 the predetermined pairing information of the Bluetooth headset 114 to the conference hub 106 at, or prior to, the scheduled time for the conference call. The server 102 may transmit 660 the predetermined pairing information of the Bluetooth headset 114 to the conference hub 106 by, for example, the server executing an email client application 227 (see FIG. 2).

If the server 102 (see FIG. 1) determines that the predetermined client pairing information (see FIG. 4) is not stored on the server, the client or user may be prompted 664 to transmit pairing information for the Bluetooth enabled headset 114. It is understood that an administrator or other authorized user may respond to the prompt to transmit the pairing information.

The server 102 (see FIG. 1) may receive 636 the pairing information for the Bluetooth headset for storing in the database 230 (see FIG. 2). Moreover, the server 102 may associate 640 the pairing information for the Bluetooth enabled headset 114 with the client identifier to form predetermined client pairing information, prior to the server storing the predetermined client pairing information. At the time of the scheduled conference, or prior to the scheduled conference, the server 102 may transmit 660 the predetermined pairing information of the Bluetooth headset to the conference.

Described are methods and systems to preset selected Bluetooth enable headsets and a Bluetooth enabled conference device or conference hub so that at the time of a scheduled conference call, the conference device can be pre-paired with each selected Bluetooth headset. When a conference call is scheduled, via for example an email client conference scheduling tool, the hub will be automatically preset so that when a particular user with a headset comes within range, the headset and hub are paired and may transmit and receive communications between them. In this manner each selected headset may be ready to use with the conference hub for the scheduled conference. The described methods and systems can be used in large scale and small scale businesses with dynamic conferencing needs. The methods and systems can integrate with widely available email client conference scheduling tools currently used by many business enterprises.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

What is claimed is:

1. A method for pre-pairing a Bluetooth enabled conference hub with a Bluetooth enabled headset, the method comprising:
   a server receiving pairing information for the Bluetooth enabled headset wherein the pairing information of the Bluetooth enabled headset is associated with a client identifier to form predetermined client pairing information;
   the server transmitting the predetermined client pairing information to the Bluetooth enabled conference hub for a scheduled communication, prior to the scheduled communication, via the Bluetooth enabled conference hub; and
   pairing the Bluetooth enabled headset with the Bluetooth enabled conference hub based on the predetermined client pairing information.

2. The method of claim 1, wherein the server transmitting the predetermined client pairing information to the Bluetooth enabled conference hub for a scheduled communication via the Bluetooth enabled conference hub comprises:
   the server executing an email client application.

3. The method of claim 1, wherein the client identifier is an email address, the method further comprising:
   the server transmitting notice of the scheduled communication to a client pursuant to the email address.

4. The method of claim 1, wherein the client identifier is a telephone number, the method further comprising:
   the server transmitting notice of the scheduled communication to a client pursuant to the telephone number.

5. The method of claim 1, further comprising:
   the server and the conference hub communicating via an IP network.

6. A method of pairing a Bluetooth enabled headset device and a Bluetooth enabled conference hub, the method comprising:
   accessing an email client application based on a client identifier;
   scheduling a scheduled time and a conference hub for conference call with the email client application based on the client identifier;
   storing the scheduled time and the conference hub on a server;
   determining whether predetermined client pairing information is stored on the server, the predetermined client pairing information including pairing information of the Bluetooth enabled headset device associated with a client identifier;
   transmitting the predetermined client pairing information of the Bluetooth enabled headset device to the conference hub, prior to the scheduled time for conference call, if it is determined that predetermined client pairing information is stored on the server.

7. The method of claim 6, wherein the server transmitting the predetermined client pairing information to the Bluetooth enabled conference hub for a scheduled communication via the Bluetooth enabled conference hub comprises:
   the server executing an email client application.

8. The method of claim 6, wherein the client identifier is an email address, the method further comprising:
   the server transmitting notice of the scheduled communication to a client pursuant to the email address.

9. The method of claim 6, wherein the client identifier is a telephone number, the method further comprising:
   the server transmitting notice of the scheduled communication to a client pursuant to the telephone number.

10. The method of claim 6, further comprising:
    the server and the conference hub communicating via an IP network.

11. The method claim 6, wherein if it is not determined that predetermined client pairing information is stored on the server, the method further comprising:
    prompting the client to transmit pairing information for the Bluetooth enabled headset; and
    the server receiving the pairing information for the Bluetooth enabled headset;
    the server associating the pairing information for the Bluetooth enabled headset with the client identifier to form predetermined client pairing information.

12. A system comprising:
    a Bluetooth enabled headset having pairing information associated therewith;
    a Bluetooth enabled conference hub configured to pair with the Bluetooth enabled headset;
    a server configured to execute an email client application that is configured to receive data for scheduling conference calls via the Bluetooth enabled conference hub, the server further configured to associate the pairing information of the Bluetooth enabled headset with a client identifier to form predetermined client pairing information and to transmit the predetermined client pairing information to the Bluetooth enabled conference hub, prior to the scheduled conference call.

13. The system of claim 12, wherein the client identifier is an email address and the server is configured to transmit notice of the scheduled communication to a client pursuant to the email address.

14. The system of claim 12, wherein the client identifier is a telephone number and the server is configured to transmit notice of the scheduled communication to a client pursuant to the telephone number.

15. The system of claim 12 wherein the server and the conference hub are configured to communicate via an IP network.

16. The system of claim 12 wherein the predetermined client pairing information is securely transmitted to the Bluetooth enabled conference hub.

17. The system of claim 12 wherein the Bluetooth enabled headset is configured for discoverable mode which is disabled when predetermined client pairing information is transmitted by the Bluetooth enabled conference hub and received by the Bluetooth enabled headset.

18. The system of claim 12 wherein there is a plurality of Bluetooth enabled headsets, each of which is configured to pair with the Bluetooth enabled conference hub based on each of the plurality of Bluetooth enabled headsets having individual predetermined client pairing information.

19. The system of claim 12 wherein the server is one of a personal computer, desktop computer, laptop computer, and a workstation.

* * * * *